(12) United States Patent
Bansleben et al.

(10) Patent No.: US 6,197,714 B1
(45) Date of Patent: Mar. 6, 2001

(54) SUPPORTED CATALYSTS AND OLEFIN POLYMERIZATION PROCESSES UTILIZING SAME

(75) Inventors: Donald Albert Bansleben, Columbia, MD (US); Eric Francis Connor, Pasadena, CA (US); Robert Howard Grubbs, South Pasadena, CA (US); Jason Ivan Henderson, Pasadena, CA (US); Andrew Robert Nadjadi, Jr., Greenville, SC (US); Todd Ross Younkin, Pasadena, CA (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/274,375

(22) Filed: Mar. 23, 1999

(51) Int. Cl.$^7$ .............................. B01J 23/40; B01J 23/74; B01J 27/043; B01J 27/185; B01J 27/24

(52) U.S. Cl. ..................... 502/155; 502/103; 502/162; 502/167; 502/168; 502/172; 526/145; 526/146; 526/147; 526/172

(58) Field of Search ...................... 502/103, 162, 502/167, 168, 172, 155; 526/145, 146, 147, 172

(56) References Cited

U.S. PATENT DOCUMENTS

| | | | |
|---|---|---|---|
| 3,635,937 | 1/1972 | Bauer et al. | 260/94.9 C |
| 3,644,563 | 2/1972 | Bauer et al. | 260/683.15 |
| 3,647,915 | 3/1972 | Bauer et al. | 260/683.15 D |
| 3,686,159 | 8/1972 | Bauer et al. | 260/94.9 C |
| 4,293,502 | 10/1981 | Beach et al. | 260/439 R |
| 4,293,727 | 10/1981 | Beach et al. | 585/526 |
| 4,301,318 | 11/1981 | Beach et al. | 585/526 |
| 4,310,716 | 1/1982 | Beach et al. | 585/526 |
| 4,382,153 | 5/1983 | Beach et al. | 585/526 |
| 4,439,540 | * 3/1984 | Cecchin et al. | 502/125 |
| 4,463,135 | * 7/1984 | Maly | 525/123 |
| 4,537,982 | 8/1985 | Starzewski et al. | 556/22 |
| 4,632,912 | * 12/1986 | Bedell et al. | 502/122 |
| 5,026,675 | * 6/1991 | Braca et al. | 502/159 |
| 5,427,991 | * 6/1995 | Turner | 502/103 |
| 5,473,020 | * 12/1995 | Peifer et al. | 525/243 |
| 5,557,023 | 9/1996 | Somogyvari et al. | 585/513 |
| 5,587,439 | * 12/1996 | DiMaio | 526/142 |
| 5,714,556 | 2/1998 | Johnson et al. | 526/135 |
| 5,852,145 | 12/1998 | McLain et al. | 526/133 |

FOREIGN PATENT DOCUMENTS

| | | |
|---|---|---|
| 0 393 751 A2 | 10/1990 | (EP) . |
| 9623010 | 1/1996 | (WO) . |
| 97/48736 | 12/1997 | (WO) . |
| 9830609 | 7/1998 | (WO) . |
| 98/42664 | 10/1998 | (WO) . |
| 98/42665 | 10/1998 | (WO) . |
| 9912981 | 3/1999 | (WO) . |

OTHER PUBLICATIONS

"Heterogenised catalysts on zeolites", Journal of Organometallic chemistry (1997), pp. 147–156.

* cited by examiner

Primary Examiner—Mark L. Bell
Assistant Examiner—Michael J. DiVerdi
(74) Attorney, Agent, or Firm—Howard Troffkin; Daniel Ruble

(57) ABSTRACT

Non-ionic bidentate late transition metal chelates tethered to an inert support by a covalent bond group to provide a catalyst useful in slurry and gas phase polymerization of olefins.

20 Claims, No Drawings

SUPPORTED CATALYSTS AND OLEFIN POLYMERIZATION PROCESSES UTILIZING SAME

The present invention was made with United States Government support under Contract No. 70NANB5H1136 awarded by the U.S. Department of Commerce's National Institute of Standards and Technology. The United States has certain rights in the invention.

BACKGROUND INFORMATION

1. Field of the Invention

The present invention is directed to supported organometallic catalysts and catalyst compositions useful in the oligomerization and polymerization of 1-olefins alone or in combination with functionalized olefins or cyclic olefins.

2. Background of the Invention

Ziegler-Natta coordination-type compounds, chromium compounds, other early transition metal compounds, as well as free-radical type of initiators have been used to catalyze the (co)polymerization of ethylene. In certain instances, catalysts alone or with an activator (e.g., trialkylaluminum) have been used with a support material such as an inorganic oxide (e.g., silica). In such instances, the catalyst is either coated on or impregnated in the support material. The commercial use of silica as a support for Ziegler-Natta catalysts is described in, for example, *Macromol. Symp.*, 1995, 89, 563.

Over the past decade, single-site catalyst systems for olefin polymerizations have been developed. These systems typically use a Group IV-B metallocene (i.e., a compound having at least one substituted or unsubstituted cyclodienyl group coordinated to a transition metal by a π bond) and a non-coordinating ionic activator (e.g., methylaluminoxane).

Such homogeneous catalyst systems generally are most suitable when used in solution polymerization processes where they provide polymers of high bulk density with good productivity. However, slurry and gas phase polymerization processes sometimes are preferred; slurry processes combine the advantages of homogeneous catalysis with the ease of particle formation and low viscosity, whereas gas phase systems alleviate the need for use and removal of a liquid reaction medium.

Catalyst compositions useful in homogeneous polymerization processes are known to have only limited utility in slurry and gas phase processes. Catalyst compositions typically used in homogenous polymerizations tend to cause reactor fouling, poor productivity, poor polymer bulk density, and poor polymer particle morphology when used in slurry processes. In the hope of overcoming these limitations, supported catalyst systems have been developed for slurry and gas phase polymerization.

One type of conventional supported catalyst system involves modifying a support with an alkylaluminum reagent followed by impregnation with a metallocene catalyst and solvent removal. However, when a catalyst merely is coated on or impregnated in a supported material, it tends to release from the support during slurry polymerizations, resulting in the same detrimental results stated above. Thus, supported catalyst systems which do not permit the catalyst to dissolve and be carried into the reaction medium are highly desirable.

Several relatively recent teachings have disclosed the use of silica-supported metallocene/partially hydrolyzed aluminumalkyl activated systems for slurry and gas phase heterogeneous olefin polymerization processes. However, these systems, like others which use methylaluminoxane (MAO) and the like as activator, have known disadvantages of requiring high molar ratios of aluminum to metallocene to achieve a catalyst composition of suitable reactivity. In addition, such systems still produce undesirable low molecular weight polymer product.

Others have proposed using certain polyanionic transition metal catalyst compositions in which the anionic moiety is composed of a plurality of metal or metalloid atom-containing, non-coordinating anionic groups that are chemically bonded to a support component (e.g., silica) through a hydrocarbyl moiety. These catalyst systems have been found to have certain disadvantages, however. First, the anionic metal or metalloid componentmodified support substrate is bonded to the catalyst by ionic bonding and requires the catalyst to provide the cationic moiety. Such bonds can permit release (resolubilization) of the catalyst, especially in slurry processes. Also, due to the catalyst's metal atom providing the cationic polymerization center as well as serving as the counterion for ionic bonding, catalytic activity can be reduced. Further, it is known that the support should be substantially free of residual hydroxyl groups as such groups are known to reduce the activity of the intended catalyst. However, the required removal of such groups is very difficult. Still further, exposure of such a catalyst to high concentrations of functional groups (especially oxygen-containing groups) can poison the catalyst system. Additionally, such catalyst systems have low catalytic activity, are sensitive to oxygen and oxygen containing-compounds, and provide polymer products having low polydispersity (i.e., a narrow molecular weight distribution). Polymer products having low polydispersity are difficult to process (e.g., extrude) by known techniques.

WO 98/42664 and WO 98/42665 describe non-ionic, late transition metal catalysts that are substantially non-oxophilic and contain bidentate ligands. These catalysts are described as useful to form linear homopolymers of 1-olefins as well as copolymers of 1-olefins, cyclic olefins, and functionalized olefins (monomers having oxygen atom-containing groups such as ether, ester, hydroxyl, carboxyl, etc., groups). Although such catalysts may be applied to a support, they generally are used in homogeneous catalyst systems.

Providing a supported non-ionic catalyst useful in slurry and heterogeneous gas phase polymerization processes is highly desirable. Further, providing neutral catalyst compositions that are covalently bonded to the support and, thereby, substantially inhibiting the catalyst moiety from releasing into the reaction medium also is desirable. Finally, providing a supported catalyst that can be used in slurry or gas phase polymerization processes without concern for the presence of oxygenated organic material within the system and/or as part of the olefinic monomer feedstock(s) also remains desirable.

SUMMARY OF THE INVENTION

The present invention provides certain neutral late transition metal chelates of salicylaldimine and pyrrolaldimine, wherein the chelate is tethered by a covalently bound chain to an inert support.

The present invention also provides a process for the polymerization of olefin and cyclic olefin monomers, and copolymerization of olefin and functionalized olefin monomers, especially under slurry or gas phase polymerization conditions utilizing the subject chelates as polymerization catalysts.

DETAILED DESCRIPTION OF PREFERRED EMBODIMENTS

The following definitions apply hereinthroughout unless a contrary intention is expressly indicated:

"hydrocarbyl" means a univalent organic group composed of hydrogen and carbon;

"hydrocarbylene" means a divalent organic group composed of hydrogen and carbon;

"hydrocarbyloxy" or "oxyhydrocarbyl" group means a univalent organic group composed of hydrogen, oxygen and carbon wherein the oxygen may be in the form of one or more ether oxygen, ester oxygen, ketone, aldehyde or carboxylic acid group(s) or mixtures thereof;

"hydrocarbyloxyene" or "oxyhydrocarbylene" means a divalent organic group composed of hydrogen, oxygen and carbon atoms wherein the oxygen atom may be in the form of an ether oxygen, ester oxygen, ketone, aldehyde or carboxylic acid group(s) or mixtures thereof;

"fluorinated" means a group having one or more of the hydrogen atoms of a hydrogen-carbon moiety substituted by fluorine atoms;

"aryl" and "arylene" mean, respectively, a monovalent and divalent carbocyclic aromatic ring or (fused or non-fused) ring system; and "substituted," in reference to moieties, means a moiety that includes one or more groups that do not interfere with the synthesis of the compound or the polymerization process for which the compound is contemplated, wherein such group(s) can be a hydrocarbyl, hydrocarbylene, oxyhydrocarbyl, oxyhydrocarbylene, etc., group.

The olefin (co)polymerization process of the present invention involves the use of a catalyst involving a late transition metal chelates tethered by a covalent bond chain to a non-ionic support and/or catalyst compositions including such a support-tethered catalyst alone or in combination with an adjunct agent and/or a Lewis base. The process is particularly useful in the polymerization of ethylene, either alone or with functionalized olefinic monomers. The process produces olefin oligomers or polymers that are substantially linear and generally have a weight average molecular weight ($M_w$) of at least about 100 for oligomers and at least about 10,000 for polymers.

PCT publication WO 98/30609, the teaching of which is incorporated herein in its entirety by reference, describes certain non-ionic, late transition metal bidentate chelates and catalyst systems made therefrom. In general, the catalysts provided in this referenced application are most suitable in homogeneous polymerization processes as they can display the limitations mentioned previously, regardless of whether they are physically supported, when used in slurry or gas phase polymerization.

The present invention provides non-ionic (neutral) late transition metal catalysts that are covalently bound to an inert support through a molecular tether. The subject support tethered catalyst of the present invention can be represented by the formula

S—T—Cat        (I)

wherein

"S" represents an inert (with respect to the polymerization process for which the catalyst is contemplated) support or surface-modified support material which is fully described herein below, "T" represents a $C_2$–$C_{40}$ hydrocarbylene, $C_2$–$C_{40}$ hydrocarbyloxyene, $C_2$–$C_{40}$ fluorinated hydrocarbylene, $C_2$–$C_{40}$ fluorinated hydrocarbyloxyene, siloxylfunctionalized $C_2$–$C_{40}$ hydrocarbylene, or borane-functionalized hydrocarbylene which is covalently bonded to both the aforementioned "S" and to the catalyst group ("Cat") described below; and "Cat" represents a non-ionic (neutral) late transition metal chelate.

The support moiety "S" can be selected from an organic material having a macromolecular structure, such as high molecular weight inert polymers, or an inorganic macromolecule. The term "support" as used herein and in the appended claims means (i) support materials that inherently have functional groups (e.g., hydroxyl groups of silica macromolecules; hydroxyl, chloro, or olefin groups of polymers; and the like) capable of forming covalent bonds with a T group, (ii) support materials which are modified to have functional groups (e.g., silane- or halosilane-modified silicas and the like) that provide functionality capable of forming covalent bonds with a T group; and (iii) support materials having functional groups that can form covalent bonds with a T group which has been modified to provide functional groups thereon capable of forming covalent bonds with the support.

The organic polymer support, prior to being tethered to the catalyst, includes or is modified so as to have functional groups of sufficient amount and capacity to react with the tethering moiety to provide a covalent bond therebetween. The organic polymer support and its functional groups preferably are inert with respect to the contemplated polymerization process (i.e., do not substantially interfere with the process). Examples of such functional groups include, for example, hydroxyl, carboxyl, halogen, ether, siloxyl, borane, amino, ester, etc., groups.

Examples of precursors of the organic polymer support component of the present support tethered catalyst are hydroxyl-substituted styrene/divinylbenzene copolymers, chloromethylated styrene/divinylbenzene copolymers, 2-hydroxyethyl acrylate/diacrylate copolymers, and the like. The particular support and functional groups present thereon can depend on the polymerization process contemplated. Their degree of inertness can be determined readily by conventional methods.

The support moiety "S" of the present support tethered catalyst also can be an inorganic oxide macromolecule. The inorganic oxides are the preferred supports. Silicas, aluminas, alumina-silicates, alumina phosphates, titanias, clays, and the like are examples of inorganic oxides that can be used as "S". Preferred inorganic oxides include alumina and silica, particularly the latter.

The support precursor material can be in any physical form, such as, for example, pelletized, granular, or an agglomerated form as long as the material has a surface area, as determined by BET nitrogen porosimetry, of from about 10 to about 10,000 $m^2/g$, preferably from about 100 to about 600 $m^2/g$. Further, the pore volume of the support, as determined by nitrogen absorption techniques, preferably is from about 0.1 to about 3 $cm^3/g$, more preferably from about 0.2 to about 2 $cm^3/g$. The average particle size of the initial support material is not critical but normally is from about 0.5 to about 500 $\mu m$. Smaller average particle size of from 0.5 to 100 $\mu m$, or even from 0.5 to 50 $\mu m$, is preferred especially when the catalyst composition is used in a continuous stirred tank reactor for a slurry-type polymerization process. Smaller particle size supports unexpectedly have been found to provide catalyst compositions that exhibit enhanced catalytic activity (productivity in g/g cat./hr).

Precursors useful in forming "S" preferably contain small amounts of hydroxyl or other functional groups pendent from its macromolecular structure. Such functional groups should be capable of reacting with one or more functional groups of the T moiety to provide a covalent bond linkage. The S functional groups normally are present in from about 0.001 to about 10 mmol/g, preferably from about 0.01 to about 5 mmol/g, and most preferably from about 0.5 to about 3 mmol/g. (The concentration of functional groups can be determined by FTIR spectroscopy, as described by P. Griffiths et al., 83 Chemical Analysis, 544, Wiley Interscience (1986).)

Although the functional groups of the support may provide a means of forming a direct covalent bond with T, as described below, treating the support's functional groups with a linking reactant to cause or enhance the formation of covalent bonds can be preferred. Thus, for example, the inorganic oxide may be treated with a hydrosilane ($R^{16}R^{17}R^{18}SiH$); a halosilane such as a chlorohydrosilane ($R^{16}R^{17}XSiH$), dichlorosilane ($R^{16}R^{17}SiX_2$), or trichlorosilane ($R^{16}SiX_3$); or an aminosilane ($R^{16}R^{17}R^{18}SiR^{19}$ where $R^{19}$ is a hydrocarbyl having an amino functional group as a part thereof) to modify the support's surface by providing functional groups thereon capable of forming covalent bonds to T functional groups. In each of the foregoing formulae, (1) X represents a halogen atom;
(2) $R^{16}$, $R^{17}$ and $R^{18}$ independently are selected from
   (a) hydrogen,
   (b) a substituted or unsubstituted $C_1$–$C_{20}$ hydrocarbyl such as, for example, alkyl groups such as methyl, ethyl, n-propyl, isopropyl, butyl (all isomers), pentyl, decyl, and the like, as well as branched isomers such as 3-ethyl-2,3-dimethylhexyl, 2,2,4,4-tetramethylpentyl, and the like,
   (c) a cycloalkyl group such as cyclopentyl, cyclohexyl, and the like,
   (d) an aryl group such as phenyl, biphenyl, and the like,
   (e) an alkaryl group such as toluyl and the like,
   (f) an aralkyl group such as 3-phenyl-n-propyl and the like,
   (g) a $C_1$–$C_{20}$ hydrocarbyloxy such as, for example, $C_1$–$C_{20}$ alkoxy such as methoxy, ethoxy, butoxy, and the like, and
   (h) an aryloxy group such as phenoxy and the like; and
(3) $R^{19}$ is a $C_3$–$C_{12}$ hydrocarbyl such as n-propyl, phenyl, 2,6-diisopropylphenyl and the like.

Each $R^{16}$ and $R^{17}$ preferably is a $C_1$–$C_6$ hydrocarbyl or a $C_1$–$C_6$ hydrocarbyloxy, and $R^{18}$ preferably is H or a $C_1$–$C_6$ hydrocarbyloxy group. Preferred silanes include phenyl silane, diphenyl silane, methylphenylsilane, dimethylsiiane, diethylsilane, diethoxysilane, dimethylchlorosilane, dimethyldichlorosilane, diethylchlorosilane, diethyldichlorosilane, γ-aminopropyltriethoxysilane, p-aminophenyltriethoxysilane, (2,6-diisopropylaminophenyl)triethoxysilane, and the like.

In a preferred embodiment, the silane and the inorganic oxide can be contacted in the presence of a base (e.g., a tertiary amine such as, for example, a tri($C_1$–$C_4$ alkyl) amine) to cause silanization of the inorganic oxide surface by reaction of the oxide's surface hydroxyl groups and removal of dihydrogen. The reaction can be carried out at temperatures of from about 0° to 110° C., preferably from about 20° to 50° C. The silane preferably is present in excess to cause substantially complete reaction with the hydroxyl groups present on the inorganic oxide's surface. The ratio of silane to inorganic oxide can be from about 1 to 2500 mmol/g inorganic oxide, preferably from about 1.5 to 20 mmol/g. The reaction can be carried out in the presence of an inert hydrocarbon liquid or in some cases a common organic solvent, like an alcohol. Such liquid can be used to wash the reaction product free of unreacted silane and of base. (Further information on this type of reaction can be found in Canadian Patent 1,087,595, the teaching of which is incorporated herein by reference.) When a silane-modified inorganic oxide is used as the support, the silane moiety is covalently bonded to the inorganic oxide through the support hydroxyl groups' oxygen atom. The silane portion of the reaction product typically contains at least one residual hydrogen atom, halogen atom, or hydrocarbyloxy group directly bonded to the silicon atom of the silane moiety for further reaction, as described below.

The support preferably is substantially free of functional groups other than surface functional groups which are inert with respect to the contemplated polymerization, typically hydroxyl groups, as described above. These groups provide reactive sites for causing covalent bonding of the tether group to the inorganic macromolecular structure. Although the support preferably is free of functional groups once the support is part of the subject support tethered catalyst, small amounts of residual functional groups are believed not to be detrimental to the activity of the resultant catalyst.

The tethering group T of the subject support tethered catalyst provides a covalent bond-forming group between the support and the pyrrolaldimine or salicylaldimine chelate moiety of the catalyst. The tethering group T and ultimately the support and tether groups together, S—T, may be bonded to the catalyst chelate group as substituent $R^1$, $R^2$, $R^3$, $R^4$, $R^5$, or X of the chelate, as described more fully below. The tethering group may be first bonded to the support and then bonded to the catalyst chelate or its precursor ligand; alternatively and preferably, the tethering group may be first bonded to or used to form the precursor ligand and then bonded to the support. The tethering group, for example, may be first reacted with or caused to be part of the ligand structure as described in the aforementioned WO 98/30609. However, in the present invention, the tethering group further has a functional group capable of reacting with the functional group of the support (regardless of whether or not the support has been modified through the addition of a silane) to provide a covalent bond between the tether group and the support. The functional group of the tether moiety may be caused to be part of the tether moiety when the tether moiety is made part of the bientate ligand, is made part of the catalyst chelate, or is made part of the tether moiety subsequent to its being made a part of the ligand or catalyst chelate. Alternatively, it can be part of the tether moiety but rendered inert (e.g., through the use of a blocking group) while the tether is reacted with the ligand precursor. The blocking group then can be removed in a conventional manner (with respect to the blocking group) to provide a reactive functional group which is capable of bonding to the support. The functional group of the tether moiety may be located at any position on the tether but preferably is located at the omega position of the tether with respect to the catalyst chelate moiety.

The covalent bond between S and T may be formed by reacting hydroxyl or other functional groups present on the surface of the modified or unmodified support with functional groups of T capable of combining with them to provide covalent bonding.

The catalyst chelate moiety "Cat" can include bidentate late transition metal chelates represented by the general formulae

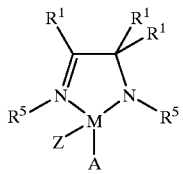
(II)

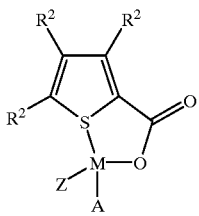
(III)

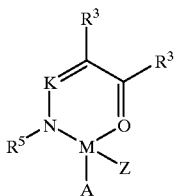
(IV)

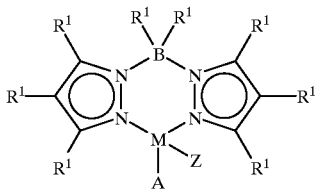
(V)

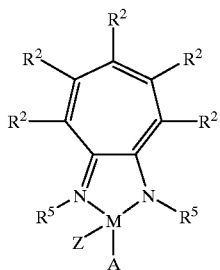
(VI)

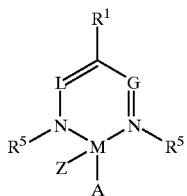
(VII)

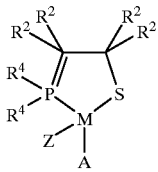
(VIII)

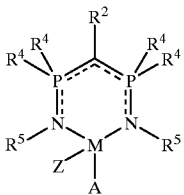
(IX)

In the foregoing formulae,
each $R^1$ independently is H, hydrocarbyl, substituted hydrocarbyl, or any two $R^1$ groups on vicinal carbons together can form a hydrocarbylene ring;
each $R^2$ independently is H, hydrocarbyl, substituted hydrocarbyl, an inert functional group, or any two $R^2$ groups on vicinal carbons together can form a hydrocarbylene ring;
each $R^3$ independently is a hydrocarbyl, substituted hydrocarbyl, an inert functional group, or the two $R^3$ group on vicinal carbons together can form a hydrocarbylene ring;
each $R^4$ independently is a substituted or unsubstituted hydrocarbyl;
each $R^5$ independently is a sterically bulky hydrocarbyl (e.g., a branched alkyl, an aryl, or a substituted aryl);
K is N or C—$R^4$;
G and L independently each is N or C—$R^3$
Z is a coordination ligand such as triphenylphosphine, tri($C_1$–$C_6$ alkyl) phosphine, tricycloalkyl phosphine, diphenyl alkyl phosphine, dialkyl phenylphosphine, trialkylamine, arylamine such as pyridine, a substituted or unsubstituted $C_2$–$C_{20}$ alkene (e.g., ethylene, propylene, butene, hexene, octene, decene, dodecene, allyl, and the like) in which the substituent is a halogen atom (preferably chloro), an ester group, a $C_1$–$C_4$ alkoxy group, an amine group (—$NR_2$ where each R individually is a $C_1$–$C_3$ alkyl), carboxylic acid, alkali metal salt, di($C_1$–$C_3$) alkyl ether, tetrahydrofuran (THF), a nitrile such as acetonitrile, or the like;
A is H; a $C_1$–$C_{11}$, preferably $C_1$–$C_5$, most preferably $C_1$, alkyl group; or a substituted or unsubstituted aromatic group;
M is a transition metal, particularly a Group VIII transition metal selected from Fe, Co, Ni, Ru, Rh, Pd, Os, Ir, Pt (preferably in the +2 oxidation state) or Ti, Zr, Hf (preferably in the +4 oxidation state), preferably Ni or Pd, most preferably Ni.

In the foregoing, one of $R^1$, $R^2$, $R^3$, $R^4$, or $R^5$ represents the tethered support group "ST" described above. When the tethered support is $R^5$, the tether moiety "T" preferably is a bulky group adjacent to the catalyst chelate to provide the structure S-AB-Cat described below.

Examples of hydrocarbyl and substituted hydrocarbyl groups include $C_1$–$C_{11}$ alkyl (preferably $C_1$–$C_5$ and most preferably tert-butyl); aryl such as phenyl, biphenyl, terphenyl, m-terphenyl, naphthyl, anthracyl, phenanthracyl, and the like; substituted aryl where the substituent is a $C_1$–$C_6$ alkyl, perfluoroalkyl, nitro, sulfonate, or halo group (preferably a phenyl having one or both ortho positions substituted with a $C_1$–$C_6$ alkyl group); alkaryl such as toluyl; and aralkyl such as trityl (triphenylmethyl), (4-ethenylphenyl) diphenylmethyl, and the like.

Examples of functional groups include halogen atoms; nitro group; sulfonate group; siloxyl groups, —$OSiD_3$, where D is phenyl or a $C_1$–$C_4$ alkyl such as isopropyl or butyl; a hydrocarbyl-terminated oxyhydrocarbylene group, —(BO)$_a$R$^7$, where 'a' is an integer from 1 to 5, each B independently is a $C_1$–$C_4$ (preferably $C_2$–$C_3$) alkylene group or an arylene group (preferably phenyl) with the proviso that the B group adjacent to the basic ring structure to which the R$^1$ is bonded preferably is phenyl, and R$^7$ is a $C_1$–$C_{11}$ (preferably $C_1$–$C_3$) hydrocarbyl group such as an alkyl or an aryl group such as phenyl, biphenyl, m-terphenyl, naphthyl, and the like, either unsubstituted or substituted with one or more $C_1$–$C_6$ alkyl groups; R$^1$ preferably is a sterically bulky group selected from aryl, substituted aryl, alkaryl, aralkyl, a branched $C_3$–$C_6$ alkyl group, or an alkoxyalkyl group, most preferably phenyl, anthracyl, phenanthracyl, terphenyl, trityl, m-terphenyl, vinyltrityl, t-butyl, or $C_1$–$C_6$ alkyl-substituted phenyl such as 2,6-diisopropylphenyl, 2,6-di(t-butyl)phenyl, 2,6-dimethylphenyl, 2-t-butylphenyl, 2-t-butyl-6-methyl phenyl, and the like.

The tether moiety T can be covalently bonded to the catalyst chelate at position R$^1$, R$^2$, R$^3$, R$^4$, or R$^5$. T can be a $C_2$–$C_{40}$ (preferably a $C_2$–$C_{12}$) hydrocarbylene, a $C_2$–$C_{40}$ (preferably $C_4$–$C_{20}$) hydrocarbyloxyene, a $C_2$–$C_{40}$ (preferably $C_3$–$C_{20}$) hydrocarbylsiloxane, a $C_2$–$C_{40}$ (preferably $C_4$–$C_{12}$) fluorinated hydrocarbylene, a $C_2$–$C_{40}$ (preferably $C_4$–$C_{12}$) fluorinated hydrocarbyloxyene group, or a $C_2$–$C_{40}$ hydrocarbylborane. T can be

- a straight (preferred) or branched chain alkylene group such as, for example, all isomers of propylene, butylene, pentylene, hexylene, dodecylene, and the like;
- alkylene or arylene siloxane such as n-propyl or phenyl triethoxysilane;
- a fluorinated alkylene group such as, for example, perfluorobutylene, perfluoropentylene, perfluorohexylene, and the like;
- an alkylene oxide chain such as, for example, ethylene oxide $(CH_2CH_2O)_x$ wherein x is 2 to 20 or propylene oxide $[CH_2CH(CH_3)O]_x$ wherein x is 2 to 13; and
- a fluorinated alkylene oxide.

The tethered moiety may be selected from arylene groups such as, for example, phenylene, biphenylene, terphenylene, m-terphenylene, naphthylene, anthracylene, phenanthracylene, tritylene, vinyl tritylene, tetraphenylmethane, vinyl tetraphenylmethane, and the like as well as substituted arylene groups wherein the substituent is, for example, $C_1$–$C_6$ alkyl, siloxyl, and/or borane groups. The tethered moiety can include a mixture of alkylene, alkyloxyene, arylene, and substituted arylene groups.

When the tethered moiety is pendent from positions R$^1$, R$^2$, or R$^3$, it preferably includes an alkylene, alkarylene, alkylene oxide, or arylene oxide chain. Examples of such tether groups are given in Table I below.

TABLE I

Tether Groups in S-T-CAT

—O—CH$_2$—
—O—CH$_2$—CH$_2$—
—O—CH$_2$—CH$_2$—CH$_2$—
—(O—CH$_2$—CH$_2$—)$_2$— x = 2–4
—CH$_2$—CH$_2$—

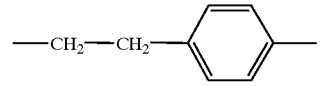

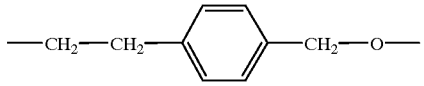

—O—

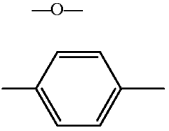

When the tethering group is covalently bonded to the catalyst moiety at position R$^5$, the tether moiety preferably includes a stericaliy bulky group adjacent to the catalyst chelate structure and a group having a substantially linear structure at the remote end of the tethering group with respect to the catalyst chelate structure (the portion of the tether moiety which is or becomes adjacent to the support macromolecule). Such a tether structure can be represented by the formula:

$$S\text{—}AB\text{—}Cat \qquad (IA)$$

where S and Cat are defined above and AB is the T group of Formula I above in which —B— is a bulky group such as an arylene group (e.g., phenylene, biphenylene, terphenylene, m-terphenylene, naphthylene, anthracenylene, phenanthracenylene, tritylene, and the like) or a substituted arylene wherein the substituent is a $C_1$–$C_6$ alkyl group (e.g., methyl, ethyl, propyl (all isomers), butyl (all isomers), etc.) or a perfluoroalkyl, nitro, sulfonate, or halo group. The "A" portion of the tether moiety T can be selected from alkylene, oxyalkylene, siloxyl, borane, fluorinated alkylene, or fluorinated oxyalkylene groups pendent from any position of the bulky group B and may be selected from $C_2$–$C_{12}$ (preferably $C_2$–$C_8$) hydrocarbyl or $C_2$–$C_{12}$ (preferably $C_2$–$C_8$) hydrocarbyloxy, preferably a $C_2$–$C_{12}$ alkylene group such as, for example, ethylene, propylene, butylene, pentylene, decylene, and the like, or a $C_2$–$C_{12}$ alkoxyene such as, for example, ethylene oxide, polyethylene oxide, propylene oxide, polypropylene oxide, their fluorinated counterparts and the like, or a siloxyl such as a tri($C_1$–$C_3$ alkoxy)silane. Examples of the tether moiety which are preferred as R$^1$ or R$^5$ of the catalyst chelate are listed in Table II below:

TABLE II
| Entry | A | B |
|---|---|---|
| 1 | —CH₂—CH₂— | 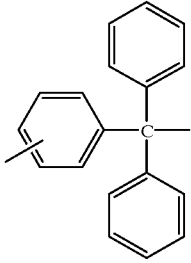 |
| 2 | —CH₂—CH₂— | 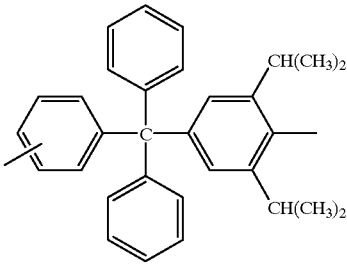 |
| 3 | —O—(CH₂)ₓ—C=O—<br>x = 2–16 | 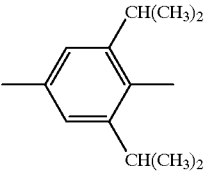 |
| 4 | —O—CH₂—CH₂— | 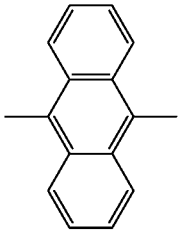 |
| 5 | —CH₂—CH₂— | 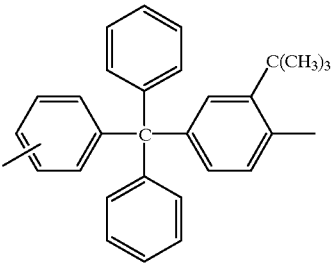 |
| 6 | —CH₂—CH₂— | 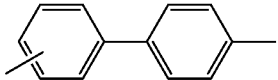 |

TABLE II-continued

| Entry | A | B |
|---|---|---|
| 7 | — | 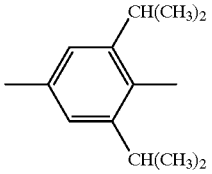 |
| 8 | —O— | 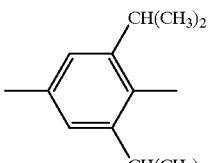 |
| 9 | —O—(CH$_2$)$_x$—CH(OH)—<br>x = 2–16 | 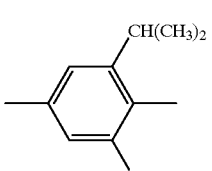 |
| 10 | ≡Si— | 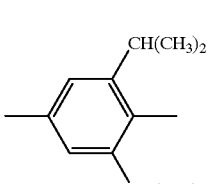 |

The tether moiety T may be covalently bonded first to the ligand, to the catalyst chelate group at the desired position thereon, or to the modified or unmodified support. The precursor of the tether moiety can have one functional group which can react with the support functional group (e.g., hydroxyl, silyl-modified hydrogen, or halogen) and one functional group which can react with the chelate. One of the functional groups may be chemically blocked so as to be inert during the formation of the first covalent bond (to the support, the ligand, or the catalyst chelate) and subsequently unblocked to be active to provide a reaction site which causes the formation of a covalent bond to the remaining group. In certain instances, both of the covalent bonds may be formed by a single process.

Compounds of formulae (II) through (IX) can be synthesized by protonation of a suitable Ni(0) or Ni(II) precursor by the neutral ligand or by reaction of a suitable Ni(II) precursor with the anionic form of the ligand. Examples of suitable Ni(0) and Ni(II) precursors include Ni(1,4-cyclooctadiene)$_2$, (N,N,N'N'-tetramethylethylenediamine)NiMe$_2$, (2,2'-bipyridine)NiMe$_2$, (MePPh$_3$)$_3$NiMe$_2$, [Ni(OMe)Me(PPh$_3$)$_2$, (pyridine)$_2$Ni(Ch$_2$=CHCO$_2$CH$_3$)$_2$, and (acetylacetonate)Ni(Et)(PPh$_3$). The addition of phosphine or ligand "sponges" such as CuCl, BPh$_3$ or tris(pentafluorophenyl)borane may aid such reactions.

Chelating ligand of formula (X) below

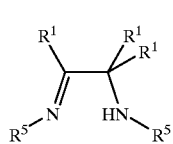

(X)

can be made by reaction of an alpha-diimine of the formula R$^5$N=CR$^1$—CR$^1$=NR$^5$, with one equivalent of a compound of the formula R$^1$Li, see for instance M. G. Gardner et al., *Inorg. Chem.*, vol. 34, p. 4206–4212 (1995). In another case, a ligand of the formula (XI)

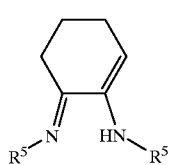

(XI)

can be made by the condensation of 1,2-cyclohexadione with the corresponding aromatic amine(s). See, e.g., R. van Asselt et al., *Recl. Trav. Chim. Pays-Bas*, vol. 113, p. 88–98 (1994). (In formula (II), R$^1$ groups taken together form a ring to make ligand (XI). The ligands then can be converted to their corresponding nickel complexes by the methods described above.)

Compounds of formula (III) can be formed from an alkali metal thiophene-2-carboxylate and the nickel precursors described above.

When K is CR⁴, the ligand for compounds of formula (IV) can be made by reacting the corresponding ketone (which may contain other functional groups) with an aromatic amine to give ligand (XII)

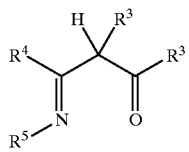
(XII)

which is a tautomer of

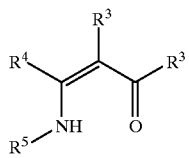
(XIII)

When K is N in compound (IV) and R² is nitrile, the ligand can be made by reacting R³C(O)CH₂CN with the diazonium salt of the corresponding arylamine. See, e.g., V. P. Kurbatov et al., *Russian J. of Inorg. Chem.*, vol. 42, p. 898–902 (1997). This paper also reviews methods of making ligands where K is CR³.

The boron-containing ligands (XIV) needed to form compounds of formula (V),

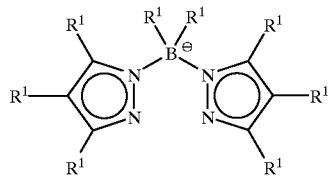
(XIV)

can be made by known procedures. See, e.g., S. Trofimenko, *Prog. Inorg. Chem.*, vol. 34, p. 115–210 (1986) and S. Trofimenko, *Chem. Rev.*, vol. 93, p. 943–980 (1993).

Synthesis of the tropolone-type ligands required for compounds of Formula (VI) are described in J. J. Drysdale et al., *J. Am. Chem. Soc.*, vol. 80, p. 3672–3675 (1958); W. R. Brasen et al., *J. Am. Chem. Soc.*, vol. 83, p. 3125–3138 (1961); and G. M. Villacorta et al., *J. Am. Chem. Soc.*, vol. 110, p. 3175–3182 (1988). These can be reacted as described above to form the corresponding Ni complex.

The ligand for compounds of formula (VII)

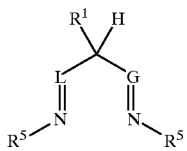
(XV)

or either of its tautomers,

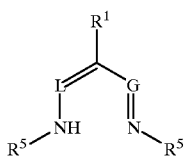
(XVI)

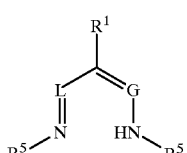
(XVII)

can be made by reaction of the appropriate α,χ-dioxo compound such as a 1,3-dione or 1,3-dial or similar compound with the appropriate aromatic amine. See, e.g., J. E. Parks et al., *Inorg. Chem.*, vol. 7, p. 1408 (1968); R. H. Holm, *Prog. Inorg. Chem.*, vol. 14, p. 241 (1971); and P. C. Healy et al., *Aust. J. Chem.*, vol. 32, p. 727 (1979).

If the ligand precursor may form a tautomer, the ligand itself usually can be considered to be a tautomer. For instance, the monoanionic ligand derived from (XV) and its tautomers may be written as

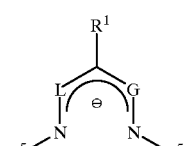
(XVIII)

In Formula (VII), when L and/or G is N, the ligand can be made by the method described in Y. A. Ibrahim et al., *Tetrahedron*, vol. 50, p. 11489–11498 (1994) and references mentioned therein.

The ligands for compounds of Formula (VIII) can be made by reacting R₂PLi (from R₂PH and n-BuLi) with propylene sulfide to form R₂CH₂CH(CH₄)SLi, and analogous reactions.

The ligands for compounds of formula (IX) can be made by methods described in *Phosphorous, Sulfur and Silicon*, vol. 47, p. 401 et seq. (1990), and analogous reactions.

Any of R¹, R², R³, R⁴, and R⁵ can be substituted with a tether moiety selected from a C₂–C₄₀ (preferably a C₂–C₁₂) hydrocarbylene, a C₂–C₄₀ (preferably a C₂–C₁₂) hydrocarbyloxyene, a C₂–C₄₀ (preferably a C₂–C₁₂) fluorinated hydrocarbylene, a C₂–C₄₀ siloxane- or borane-functionalized hydrocarbylene, or a C₂–C₄₀ (preferably a C₂–C₁₂) fluorinated hydrocarbyloxyene group. The tether moiety can contain at least one functional group capable of reacting with a functional group of the support to provide a covalent bond therewith.

Further, although R¹ can be H, it more preferably is a bulky group that can sterically shield the transition metal's equatorial face by being wellpositioned in the plane of the transition metal complex as well as providing some bulk in the axial face. For example, R¹ preferably is an aryl group such as phenyl, biphenyl, terphenyl, m-terphenyl, naphthyl, anthracenyl, trityl, substituted trityl, or phenanthracenyl; a nitro-substituted aryl group; or a bulky alkyl group such as a tert-butyl group. When R¹ provides the tether moiety, R¹ preferably provides a sterically bulky group adjacent to the ring. The sterically bulky group preferably is further substituted with an alkylene or oxyalkylene group including a functional group capable of reacting with the functionalized support (e.g., vinyl, hydroxyl-terminated alkylene, or oxyalkylene group).

The amine compound used in forming the imine group of the catalyst further may provide the functional group useful in covalently bonding with the support. For example, a p-aminostyrene or 3,5-dialkyl-substituted 4-aminostyrene can be treated with a silane or silane-modified support either prior to or after (preferred) its use in forming the imine group of the chelate. The reaction of silane with the vinyl substituent may be carried out in the presence of a noble metal catalyst such as chloro platinic acid (H$_2$PtCl$_6$). The silane can be R$^{16}$R$^{17}$R$^{18}$SiH, R$^{16}$R$^{17}$XSiH, R$^{16}$R$^{17}$SiX$_2$, or R$^{16}$SiX$_3$ where a least one R$^{16}$, R$^7$, and R$^{18}$ is H or a C$_1$–C$_5$ alkoxy group while the remaining groups are defined as above. The silane adds across the ethylenic double bond to yield a functional linking group that can provide the required covalent bond between the support and the tether group. Alternatively, a chlorosilane can be reacted with a hydroxy-terminated tether group such as, for example, AB structure 8 in Table II to provide the required covalent bond between the support and the tether group. Where appropriate, when the hydroxyl-containing tether is part of the amine being used to provide the imine moiety of the chelate, forming the imine prior to silanization can be preferred.

The inorganic oxide support treated with a silane, as described above, can be reacted directly with functional groups of T. For example, a support modified with a hydrosilane, an alkoxysilane, or a chlorosilane, as described above, can be reacted directly with a hydroxy-functionalized tether to provide a covalent bond. Alternatively, a silane-modified support can be contacted in the presence of a noble metal catalyst (e.g., PtCl$_2$) with an ethylenic group-containing tether moiety to provide a covalent bond therebetween. Other functional groups (e.g., borane) may be used as long as the functional group of S and T are capable of combining to provide the required covalent bond.

The chelate portion of the supported catalyst can be synthesized according to the procedure described in WO 98/30609 except that at least one of R¹, R², R³, R⁴, and R⁵ has a functional group capable of forming a covalent bond with the functional groups of the support(s) or silane-modified support(s).

As described above, R¹ and R⁵ each independently can be a hydrocarbyl-terminated oxyhydrocarbylene containing group. Such groups may be represented as —(BO)$_z$R⁷ where each B independently is a C$_1$–C$_4$ (preferably C$_2$–C$_3$) alkylene group or an arylene group, R⁷ is a C$_1$–C$_{11}$ (preferably C$_1$–C$_3$) hydrocarbyl group such as alkyl, aryl, alkaryl, or aralkyl group, and z is an integer of 1 to 4.

The support tethered chelates of late transition metals described above can provide catalysis for olefin polymerizations, providing substantially linear products having a low degree of branching. These complexes are neutral compounds and, as such, do not require the presence of organoaluminum, partially hydrolyzed organo-aluminum compounds, or other reducing agents to cause activation of the complex toward the olefin insertion reaction and polymerization. However, organoaluminum and hydrolyzed organoaluminum compounds, such as methyl alumoxane or trialkylaluminum compounds, may be present and preferably are present when R⁶ is a halogen.

The subject support tethered non-ionic bidentate chelates may be used as the sole catalyst in such polymerizations, especially where R¹ includes a sterically bulky group such as phenyl, biphenyl, terphenyl, m-terphenyl, anthracenyl, trityl, vinyltrityl, phenanthracenyl, nitro-substituted aryl, or the like, either alone or as part of the ST group. Alternatively, the subject chelates can be used with an adjunct agent and/or a Lewis base. The adjunct agent can include a phosphine sponge material capable of facilitating phosphine (ligand L) dissociation and trapping of free phosphine. Such catalyst composition adjunct agents include, for example, bis(cyclooctadiene)-nickel, tris (pentafluorophenyl) boron, 9-borabicyclo[3.3.1]nonane (9-BBN), methyl iodide, and the like.

The subject support tethered catalyst unexpectedly has been found to provide an enhanced catalyst composition when combined with a Lewis base as, for example, ethers, esters, aldehydes, ketones, alcohols, amides, organic carbonates, organonitro compounds, and even water. Organometallic catalysts conventionally are combined with Lewis acids to provide an effective catalyst system and that water acts as a poison thereto. In contrast, the present single site catalyst can be used in the absence or the presence of moisture or other oxygenated compounds and still provide an effective catalyst system for olefin polymerizations and copolymerization.

Lewis base additives useful in combination with the catalyst of compound (II) or (III) include ethers such as dialkyl ethers where each alkyl group independently is a C$_1$–C$_{18}$, preferably C$_1$–C$_5$, alkyl group such as, for example, diethyl ether, methyl ethyl ether, diisopropyl ether, ethyl propyl ether, dibutyl ether, and the like; vinyl ethers such as, for example, ethyl vinyl ether and phenyl vinyl ether; aryl ethers such as, for example, dibenzyl ether, diphenyl ether, dinaphthyl ether, and the like; mixed ethers such as, for example, amyl phenyl ether, methyl benzohydryl ether, benzyl phenyl ether, anisole, phenetole, and the like; cyclic ethers such as, for example, THF, dioxane-1,4, dioxane-1,3, crown ethers (e.g., 18-crown-6, 14-crown-5, 12-crown-4, etc.), and the like; polyethers such as dimethoxyethane, diglyme, triglyme, pentaglyme, and the like; and polyoxyalkylenes such as, for example, polyoxyethylene or poly (oxypropylene) (preferably lower molecular weight polymers which are miscible in the polymerization solvent used). The foregoing ethers, especially the alkyl and/or aryl group-containing ethers and cyclic ethers described above, and most preferably dialkyl ether (diethyl ether) and low molecular weight polyethers (dimethoxy ethane), have been found to be effective solvents or co-solvents for use in the polymerization process when the subject catalyst (I) is used, as described below.

The Lewis base may be an organic ester represented by the formula

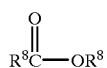

wherein each R⁸ independently is a C$_1$–C$_{11}$ alkyl group, preferably a C$_1$–C$_5$ alkyl group. Examples of useful organic esters include ethyl acetate, propyl acetate, hexyl acetate, ethyl butyrate, propyl butyrate, ethyl caproate, ethyl caprylate, and ethyl laurate.

Aldehydes and ketones also have been found to be useful as a Lewis base additive in forming the subject catalyst composition. They may be represented by the formula

wherein $R^9$ is a $C_1$–$C_{12}$ hydrocarbyl selected from unsubstituted or substituted (e.g., carbonyl) alkyl, aryl, alkaryl, or aralkyl groups and $R^{10}$ is H or an $R^9$ group independently selected. For example, useful ketones include acetone, propanone, butyrone, 4-heptanone, 2,4-pentanedione, and the like, as well as cyclic ketones such as cyclohexanone, 1,4-cyclohexanedione, and the like. Useful aldehydes include acetaldehyde, capraldehyde, valeraldehyde, and the like.

Still further, an alcohol can be used as the Lewis base additive in forming the subject catalyst composition. Monohydric or polyhydric alcohols including, for example, alcohols having a hydrocarbyl moiety composed of a $C_1$–$C_{12}$ (preferably $C_1$–$C_3$) alkyl, aryl (e.g., phenyl or benzyl), alkaryl, and aralkyl groups can be used. Examples of such alcohols include methanol, ethanol, propanol, isopropanol, butanol, t-butanol, 2-pentanol, 3-hexanol, glycol, 1,2,3-propanetriol, phenol, phenethyl alcohol, and para-methyl phenol and the like.

Amides can be used as the Lewis base additive in forming the subject catalyst composition. The amides may be represented by the formula

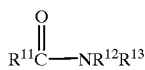

wherein $R^{11}$ and $R^{12}$ each is independently a $C_1$–$C_{11}$ hydrocarbyl, and $R^{13}$ is H or a $C_1$–$C_{11}$ hydrocarbyl.

$R^{12}$ and $R^{13}$ preferably are independently selected from $C_1$–$C_3$ alkyl groups.

Nitroalkanes and nitroaromatics also have been found to be useful as a Lewis base additives. The nitroalkanes may be a mono- (preferred) or poly-nitro compound formed with a $C_1$–$C_{11}$ (preferably $C_1$–$C_3$) alkyl group. With respect to nitroaromatics, mono nitro compound such as nitrobenzene are preferred.

The subject catalyst composition unexpectedly can contain small amounts of water without destroying the activity of the catalyst of the subject invention. Thus, unlike most organometallic catalysts, the presently described catalyst can be used in the presence of small amounts of moisture to provide a catalyst composition which can remain active in the polymerization of olefins or mixtures of olefins and functional olefin monomer(s). The moisture may be present in adsorbed form with respect to the support material. The molar ratio of water to support tethered catalyst compound (II) or (III) which may be present can range from about 0 to about 100, preferably from 0 to 10.

The amount of the Lewis base (except water) additive can be substantially any amount desired with from about $10^0$ to $10^4$ times the amount of support tethered catalyst compound (II) or (III) on a molar basis being preferred. Preferably, from $10^1$ to $10^3$ times the molar amount of catalyst is used when an ether, a low molecular weight polyether, or nitrile is the Lewis base used or from $10^0$ to $10^2$ the molar amount of catalyst when another Lewis bases is used.

The present invention also provides a process for making polymers in which the subject catalyst composition is contacted with one or more selected olefins or cycloolefins, alone or optionally with a functional 1-olefin such as a carboxylic acid of the formula $CH_2=CH(CH_2)_mCOOH$, a carboxylic acid ester of the formulae $CH_2=CH(CH_2)_mCO_2R^{14}$ or $CH_2=CHOCOR^{14}$, an alkyl vinyl ether of the formula $CH_2=CH(CH_2)_mOR^{14}$, a vinyl ketone of the formula $CH_2=CH(CH_2)_mC(O)R^{14}$, a vinyl alcohol of the formula $CH_2=CH(CH_2)_mOH$, or a vinyl amine of the formula $CH_2—CH(CH_2)_mNR^{15}{}_2$, wherein m is an integer of from 0 to 10, $R^{14}$ is a $C_1$–$C_{10}$ hydrocarbyl, aryl or substituted aryl group (preferably methyl), and $R^{15}$ is H or an independently selected $R^{14}$ group; a functional cycloolefin, such as exo-functionalized norbornene wherein the functional group is an ester, alcohol, carboxylic acid, halogen atom, or tertiary amine group; unsaturated dicarboxylic acid anhydride; carbon monoxide; and other selected monomers such as vinyl halides. The process described herein produces a polymer with a $M_w$ of at least about 1000.

Alternatively, the catalytic polymerization of the present invention can be carried out by contacting one or more selected olefins or cycloolefins alone or optionally with a functional olefin monomer, as described above, with a catalyst composition formed in-situ and composed of one or more support tethered bidentate ligand (X or XVIII) described above in combination with a transition metal (M) organic complex, $A(Z)_2MY$ where Y is a halogen and A, Z, and M are defined as above. The support tethered ligand (X or XVIII) and complex preferably is used in a molar ratio of about 1:1 to 1:1.2 preferably from 1:1 to 1:1.1. The support tethered catalyst composition composed of ligand (X or XVIII) and transition metal organic complex may further contain a phosphine sponge and/or a Lewis base additive, such as those described above, or an organoaluminum or hydrolyzed organoaluminum compound or mixtures thereof as described above.

In all catalysts and precursor bidentate ligands described herein having an $R^5$ group, each such group preferably is a sterically bulky hydrocarbyl. Specifically, in preferred embodiments, each $R^5$ independently can be a bulky aryl, substituted aryl, or alkaryl group. Complexes with $R^5$ of this type generally produce polymers with higher molecular weights and greater linearity for any given set of conditions. A catalyst or catalyst composition with a phosphine sponge adjunct and/or organoaluminum compound adjunct, or with the Lewis base additive or mixtures of adjunct and Lewis base when optionally used, are contacted with ethylene or other 1-olefin and/or 4vinylcyclohexane, 4-vinylcyclohexene, cyclopentene, cyclobutene, substituted norbornene, or norbornene, usually in the liquid phase. The liquid phase may include a compound added just as a solvent, the monomer(s) itself, and/or the Lewis base (especially an ether compound) in the liquid phase at reaction conditions. When an adjunct is used, the molar ratio of adjunct to compound (II) or (IX) can be from about 0.001:1 to 15:1, preferably from about 0.01:1 to about 8:1, and most preferably from about 0.1:1 to 3:1.

The temperature at which the polymerization is carried out can range from about −100° to about +200° C., preferably from about −20° to about +100° C., and most preferably from about 0° C. to about 90° C., including all subsets of temperature ranges. The pressure at which the polymerization is carried out is not critical, with atmospheric pressure to about 100 MPa or more being suitable. Nevertheless, pressure may affect the yield, molecular weight, and linearity of the polyolefin produced, with increased pressure providing polymers that are more linear and have a higher molecular weight.

Preferred 1-olefins and cyclic olefins include one or more of ethylene, propylene, 1-butene, 1-hexene, 1-octene, 1-pentene, 1-tetradecene, norbornene, and cyclopentene. Ethylene, propylene, cyclopentene, and norbornene are particularly preferred, with ethylene alone being especially preferred.

The polymerization process can be run under gas phase reaction conditions or in the presence of various liquids. The catalyst of the present invention is especially useful in slurry processes. Solvents in which the polymerization may be conducted include (i) the aforementioned monomer(s) per se,
(ii) any organic compound which is liquid under the reaction conditions, substantially non-solvating for the product, and inert to the reactants and product,
(iii) a Lewis base additive (except water which, when used, should be present in limited amounts) which is liquid under the reaction conditions, or
(iv) mixtures of any two or more of the foregoing.

Particularly preferred are non-polar organic liquids, aprotic organic liquids, organic ethers, or mixtures thereof. The monomer(s) and resultant polymer may be soluble or insoluble in these liquids; however, these liquids should not prevent or substantially hinder polymerization from occurring. Suitable liquids include, but are not limited to, alkanes, cycloalkanes, halogenated hydrocarbons, ethers, and halogenated and non-halogenated aromatic hydrocarbons. Specific examples of useful solvents include pentane, hexane, heptane, toluene, mineral spirits, xylenes, benzene, methylene chloride, ethyl ether, dimethoxyethane, tetrahydrofuran, and crown ethers.

When CO is used as a comonomer, it tends to form alternating copolymers with various 1-olefins. In such polymerizations, both CO and the olefin simultaneously are in the process mixture along with the catalyst composition.

In many polymerizations, certain general trends may occur, although for all of these trends there are exceptions. Pressure of the monomers (especially gaseous monomers such as ethylene) and reaction temperatures often affect the polymerizations. Higher pressures often reduce branching and extends polymer chain length, especially in polymers which include mer units derived from ethylene. Temperature also affects these polymerizations. Higher temperatures usually increases branching and decrease polymer molecular weight.

In general, the period of time during which the catalyst remains active can be extended greatly based on a particular ligand structure, polymerization temperature, and/or choice of Lewis base. Catalyst lifetime can be extended by the absence of co-catalyst adjunct, the presence of a Lewis base such as ether or dimethoxyethane, and/or the presence of a bulky substituted or unsubstituted aryl $R^5$ group or, optionally, in the presence of a Lewis base, as described above.

When the resulting polymer includes mer units derived from one or more functional group-containing monomers, the functional group(s) can be used to crosslink the polymer. For examples, a copolymer of an olefinic carboxylic acid or olefinic ester with a 1-olefin can be crosslinked by reaction with a diamine or a diisocyanate to form a bisamide. The carboxyl groups also can be neutralized with a mono- or divalent metal-containing base (e.g., NaOH, CaO) to form an ionomeric or pseudo-crosslinked polyolefin copolymer.

Polymer products, especially those of ethylene homo- or copolymers, can exhibit varying degrees of branching. NMR spectroscopy can determine the total number of branches, branching distribution, and to some extent branch length. (Alternatively, branch content can be estimated from correlation of total branches as determined by NMR with polymer melting point as determined by differential scanning calorimetry.) The amount of branching is expressed as the number of branches per 1000 total carbon atoms in the polymers, with one exception: carbon atoms that are in an ester or ketone group are not counted as part of the 1000 carbon atoms. For example, ethylene homopolymers can have a branch content (not including polymer end groups) of from 0 to about 150 branches, preferably from about 5 to about 100, and most preferably from about 3 to about 70 branches per 1000 carbon atoms.

Polymers formed by the present invention may be mixed with various additives normally used with elastomers and thermoplastics [see EPSE (below), vol. 14, p. 327–410, the teaching of which is incorporated herein by reference]. For instance, reinforcing, non-reinforcing and conductive fillers, such as carbon black, glass fiber, minerals (e.g., silica, clay, mica, and talc), glass spheres, barium sulfate, zinc oxide, carbon fiber, and aramid fiber or fibrids may be used. Antioxidants, antiozonants, pigments, dyes, slip agents, antifog agents, antiblock agents, delusterants, or compounds to promote crosslinking may be added. Plasticizers also can be used.

Polymers formed by the present invention may be used for one or more of the applications listed below. In some cases, a reference is given which discusses such uses for polymers in general. All of these references are incorporated herein by reference. For the references, "U" refers to W. Gerhartz et al., Ed., *Ullmann's Encyclopedia of Industrial Chemistry*, 5th ed; VCH refers to Verlagsgesellschaft mBH, Weinheim, for which the volume and page number are given; "ECT3" refers to H. F. Mark et al., Ed., *Kirk-Othmer Encyclopedia of Chemical Technology*, 3rd ed., John Wiley & Sons, New York; "ECT4" refers to the J. I. Kroschwitz et al., Ed., *Kirk-Othner Encyclopedia of Chemical Technology*, 4th ed., John Wiley & Sons, New York, for which the volume and page number are given; "EPST" refers to H. F. Mark et al., Ed., *Encyclopedia of Polymer Science and Technology*, 1st ed., John Wiley & Sons, New York, for which the volume and page number are given; "EPSE" refers to H. F. Mark et al., Ed., *Encyclopedia of Polymer Science and Engineering*, 2d ed., John Wiley & Sons, New York, for which volume and page numbers are given; and "PM" refers to J. A. Brydson, Ed., *Plastics Materials*, 5th ed., Butterworth-Heinemann, Oxford, UK, 1989, and the page is given. In these uses, polyethylene, polypropylene, and/or a copolymer of ethylene and propylene are preferred.

1. The polyolefins herein are especially useful in blown film applications because of their particular rheological properties (EPSE, vol. 7, p. 88–106). These polymers preferably have some crystallinity.

2. The polymers are useful for blown or cast films or as sheet materials (see EPSE, vol. 7 p. 88–106; ECT4, vol. 11, p. 843–856; PM, p. 252 and p. 432ff). The films can be mono- or multilayer, with multilayer films optionally including other polymers, adhesives, etc. For packaging the films may be stretch-wrap, shrink-wrap or cling wrap and may also be heat sealable. The films are useful for many applications such as packaging foods or liquids, geomembranes and pond liners. These polymers also preferably have some crystallinity.

3. Extruded films or coextruded films may be formed from these polymers, and these films may be treated, for example by uniaxial or biaxial orientation after crosslinking by actinic radiation, especially electron beam irradiation. Such extruded films are useful for packaging of various sorts. The extruded films may also be laminated to other films using procedures known to those skilled in the art. The laminated films are also useful for packaging of various sorts.

4. The polymers, particularly if elastomeric, may be used as tougheners for other polyolefins such as polypropylene and polyethylene. 5. Tackifiers for low strength adhesives (U, vol. Al, p. 235–236) are a use for these polymers. Elastomers and/or relatively low molecular weight polymers are preferred.

6. An oil additive for smoke suppression in single-stroke gasoline engines is another use. Elastomeric polymers are preferred.

7. The polymers are useful as base resins for hot melt adhesives (U, vol. Al, p. 233–234), pressure sensitive adhesives (U, vol. Al, p. 235–236) or solvent applied adhesives. Thermoplastics are preferred for hot melt adhesives.

8. Base polymer for caulking of various kinds is another use. An elastomer is preferred. Lower molecular weight polymers are often used.

9. Wire insulation and jacketing may be made from any of the polyolefins (see EPSE, vol. 17, p. 828–842). In the case of elastomers it may be preferable to crosslink the polymer after the insulation or jacketing is formed, for example by a free radical process.

The following examples are provided for illustrative purposes only and are not meant to be a limitation on the scope of the invention. All parts and percentages are by weight unless otherwise indicated.

EXAMPLES

Example 1: Support-Tethered Catalyst with Ligand of Formula II

The procedure described in WO 98/30609 was used to make a silica-tethered chelate of the compound of Formula (II). A solution of 1,2-cyclohexanedione (8.8 mmol), 2,6-diisopropylaniline (8.8 mmol), and a drop of formic acid are stirred in methanol (20 mL) at room temperature for 3 days. At the end of this time, one equivalent of 2,6-diisopropyl-4-hydroxyaniline and an additional drop of formic acid is added, and the reaction is allowed to proceed at room temperature for an additional 3 days. The white solid which forms is filtered, washed with a small volume of cold methanol (5 mL) and dried under vacuum. Yield after recrystallization from methanol is about 40%.

A phenylsilane (PhSiH$_3$) modified silica for support of the above ligand is prepared according to the procedure described in WO 97/19959. 10 g of Davison™ 952 silica (Davison Chemical Co.; Columbia, Md.), pre-calcined at about 800° C., is placed in a 3-neck flask equipped with condenser, an addition funnel with equalizing side tube, and a magnetic stir bar. Under an Ar atmosphere, n-pentane (150 mL) is added, followed by injection by syringe of phenylsilane (2.7 g, 25 mmol) and triethylamine (2.5 g, 25 mmol), respectively. Hydrogen gas evolves. The slurry is stirred magnetically for about 12 hours. The phenylsilane-modified silica is collected on a frit under Ar, washed with pentane (5×5 mL), and dried under vacuum. Yield is about 10.4 g. DRIFF IR: n(Si—H) 2178 cm$^{-1}$ (vs). The hydroxyl content of the silane-modified silica is undetectable (<0.01 mmol/g).

The above iminoamine ligand is tethered to phenylsilane (PhSiH$_3$) modified silica according to the procedure described in WO 97/19959. An ether (30 mL) slurry of the phenylsilane-modified silica (3 g) is combined with an ether solution (100 mL) of the hydroxy-functional iminoamine compound described above at room temperature under an Ar atmosphere. Hydrogen gas evolves from the solution. The solution is stirred for an additional 12 hours at room temperature, and the resulting solid is filtered, washed with ether (5×20 mL) and pentane (3×20 mL), and dried under reduced pressure.

A neutral Ni(II) chelate of the above silica-tethered iminoamine ligand is prepared after deprotonation (according to the general procedure described in WO 98/30609) of the amine functionality on the support tethered ligand. The deprotonated ligand is slurried in dry benzene at room temperature with bis(triphenylphosphine)nickel(phenyl) chloride. The colored solid product is recovered by cannula filtration on a frit, washed with pentane (2×5 mL), and dried under vacuum. The silica-tethered neutral Ni(II) chelate is useful as a heterogeneous polymerization catalyst for olefins and has the structure of Formula (II), where R$^1$ on vicinal carbon atoms form a cyclohexenyl ring; R$^5$ on the imine carbon is 2,6-diisopropylphenyl; R$^5$ on the amine carbon is 2,6-diisopropyl-4-hydroxyphenyl; M is Ni(II); Z is triphenylphosphine; and A is phenyl.

Example 2: Support Tethered Catalyst with Ligand of Formula VII

In a first synthetic transformation, 2,6-diisopropyl-4-hydroxyaniline is tethered (covalently bonded) through its 4-hydroxy group to the surface of phenylsilane (PhSiH$_3$)-modified silica. Surface treatment of the silica is carried out in a manner analogous to the procedure described in WO 97/19959. 10 g of Davison™ 952 silica pre-calcined at about 800° C. is placed in a 3-neck flask equipped with condenser, an addition funnel with equalizing side tube, and a magnetic stir bar. Under an Ar atmosphere, n-pentane (150 mL) is added, followed by injection by syringe of phenylsilane (2.7 g, 25 mmol) and triethylamine (2.5 g, 25 mmol), respectively. Hydrogen gas evolves. The slurry is stirred magnetically for about 12 hours. The phenylsilane-modified silica is collected on a frit under Ar, washed with pentane (5×5 mL), and dried under vacuum. Yield is about 10.4 g. DRIFT IR: n(Si—H) 2178 cm$^{-1}$ (vs). The hydroxyl content of the silane-modified silica is undetectable (<0.01 mmol/g) spectroscopically.

Using a procedure adapted from J. E. Parks et al., *Inorg. Chem.*, 7, 1408–1416, (1968), acetylacetone is refluxed in dry THF with the aforementioned 2,6-diisopropyl-4-hydroxyaniline modified silica to produce silica with tethered β-ketoimine groups on the surface. The silica tethered product is collected as a yellow solid, washed with THF until the washings are colorless, and dried under vacuum.

The silica-tethered β-ketoimine is converted to the tethered β-iminoamine compound using a procedure analogous to that described in G. Schiebe, Ber., 56, 137 (1923). Silica-tethered β-ketoimine from above and 9-aminoanthracene hydrochloride in equimolar amounts are refluxed in dry ethanol for 5 hours. The support-tethered β-iminoamine hydrochloride is deprotonated and converted to the corresponding neutral Ni(II) chelate by reaction in dry benzene with bis(triphenylphosphine)nickel(phenyl) chloride using a procedure analogous to that described above in Example 1. The silica-tethered chelate is isolated by filtration, washed with benzene until the washings are colorless, and dried under reduced pressure. The resultant silica-tethered neutral Ni(II) chelate is useful as a heterogeneous catalyst for olefin polymerization and has the structure of Formula (VII), where $R^1$ is hydrogen; $R^5$ of the imino moiety is 2,6-diisopropyl-4-hydroxyphenyl; $R^5$ of the amine moiety is 9-anthracene; each of L and G are —C(CH$_3$); Z is triphenylphosphine; A is phenyl; and M is Ni(II).

Example 3: Support Tethered Catalyst with Ligand of Formula VI

A support tethered chelate of an N,N'-iminoaminotropolone of Formula (VI) is prepared according to the procedure described in W.R. Brasen et al., *J. Am. Chem. Soc.*, 83, 3125–3135 (1961). To a stirred solution of 2,6-diisopropylaniline (4 mmol) and triethylamine in methanol (150 mL) is added, over a period of about 1 hour, a solution of 5,5,6,6-tetrafluoro-1,3-cycloheptadiene (4 mmol) in methanol (50 mL). Thereafter, the mixture is refluxed for an additional 2 hours before the solution is added dropwise to a methanolic solution of 2,6-diisopropyl-4-hydroxyaniline (1 equiv.) and triethylamine. The resultant mixture is refluxed for an additional 2 hours then chilled in ice to precipitate the product. The solid is collected by filtration, washed with methanol, and recrystallized in methylene chloride/ethanol.

The hydroxyl-functionalized iminoaminotropolone ligand is attached to a silane-modified silica, specifically phenylsilane (PHSi$_3$)-modified silica prepared in a manner analogous to Example 1. Covalent attachment of the ligand to the silane-modified silica also is carried out in a manner analogous to that described in Example 1. After forming the deprotonated form of the silica-tethered iminoaminotropolone ligand, the neutral Ni(II) chelate is formed in a manner analogous to the procedure of Example 1.

The support tethered neutral Ni(II) chelate of iminoaminotropolone is useful as a heterogeneous catalyst for olefin polymerization. The aforementioned chelate has the structure of Formula (VI), wherein each $R^2$ is H; $R^5$ at the imino N is 2,6-diisopropylphenyl; $R^5$ at the amino N is 2,6-diisopropyl-4-hydroxyphenyl; M is Ni(II); Z is triphenylphosphine; and A is phenyl.

Example 4: Support Tethered Catalyst with Ligand of Formula IX

Preparation of silica-tethered chelate of Formula (IX) is described, where the tether group is a part of the $R^2$ moiety of the ligand. For the preparation of the organophosphorus ligand of the chelate of Formula IX, a procedure similar to that described in WO 98130609 is used. A 100 mL 3-neck round-bottom flask is fitted with a condenser, N$_2$ inlet, and an addition funnel. Into the flask is placed a solution of bis-(diphenylphosphino)-pethenylphenylmethane (7.8 mmol) in toluene (20 mL). Into the addition funnel is placed a solution (12 mL) of 2-tert-butylphenylazide (15.8 mmol), prepared from 2-tert-butylaniline hydrochloride, sodium nitrite, and sodium azide. The solution of bis-phosphino compound is heated to about 60° C., and the substituted aryl azide solution is added slowly to the reaction mixture with evolution of N$_2$. Thereafter, the reaction mixture is kept at 60° C. for an additional 4 hours. Solvent is removed under vacuum, and the solid product is collected and recrystallized from diethyl ether/hexane solution. Yield of vinylsubstituted bis-(phosphino) iminoamine is about 60%.

The above product is tethered to the surface of phenylsilane-modified silica. The phenylsilane-modified silica is prepared according to the procedure of Example 1. To accomplish tethering of the ligand to the silane-modified silica, a hydrosilation reaction of the vinyl compound with phenylsilane-modified silica is carried out in pentane solution (150 mL) in the presence of a catalytic amount of H$_2$PtCl$_6$. The support tethered ligand is then deprotonated as described in WO 98/30609. The silica-tethered neutral Ni(II) complex is prepared by reaction of the deprotonated form of the support tethered ligand with bis(triphenylphosphine) nickel(phenyl) chloride in dry benzene solution. The support tethered neutral Ni(II) chelate recovered on removal of solvent and drying is useful as a heterogeneous catalyst for olefin polymerization, in the manner described below. The structure of the ligand is that of the compound of Formula (IX) wherein $R^2$ is p-ethenylphenyl; each $R^4$ is phenyl; $R^5$ is 2-tert-butylphenyl; Z is triphenylphosphine; and A is phenyl.

Example 5: Support Tethered Catalyst with Ligand of Formula VIII

The procedure described in WO 98/30609 is used to prepare a vinyl-functionalized ligand of Formula (VIII). A 100 mL Schlenk flask is charged with a THF (20 mL) solution of lithium (4-ethenylphenyl)phenyl phosphine (prepared from the phosphine mentioned and lithium diisopropylamide). The flask is chilled to −78° C., and propylene sulfide (7.0 mmol) is vacuum transferred onto the Li salt solution. The reaction mixture is stirred and kept at −78° C. for about an hour, after which time the mixture is allowed to warm to room temperature. The solvent is removed under vacuum, and the solid product is recovered, washed with hexane (3×30 mL), and dried under vacuum. Yield is about 78%.

The above bidentate ligand is tethered to silica with its surface modified with PhSiH$_3$ according to the procedure described in Example 1. The tethering reaction, which involves hydrosilation of the ethenyl group on the phosphine moiety with Si—H groups on the silica surface, is accomplished using the procedure described in Example 4. Metallation of the sodium salt form of the silica tethered ligand of above is accomplished with bis(triphenylphosphine) nickel(phenyl) chloride in a manner analogous to that described in Example 1.

The support tethered neutral Ni(II) chelate from above is useful as a heterogeneous catalyst for olefin polymerization, in the manner described below. The tethered chelate has the structure of Formula (VIII) where each $R^2$ group adjacent to S is H; one $R^2$ group adjacent to P is methyl while the other is H; one $R^4$ group is phenyl while the other is 4-ethenylphenyl; M is Ni(II); Z is triphenylphosphine; and A is phenyl.

Example 6: Support Tethered Catalyst of Formula III

Preparation of silica-tethered neutral Ni(II) chelate of a substituted 2-thiophenecarboxylate ligand is described with the tether group precursor, 9-(β-hydroxyethyl)-10-bromoanthracene, being prepared according to the procedure of G. Olah et al., *J. Org. Chem.*, 1984, 49, 2925–2937. To a solution of 9,10-dibromoanthracene (10 mmol) in dry THF (50 mL) at −78° C. is added n-butyl lithium (12 mmol) in THF solution. The reaction mixture is stirred at this temperature for an additional one hour. Acetaldehyde (10 mmol) in dry THF (10 mL) is added dropwise before the reaction mixture is warmed to room temperature and stirred for an additional hour. Work up and recrystallization of the solid residue by chloroform-hexane gives 9-(β-hydroxyethyl)-10-bromoanthracene in about 85% yield, m.p. 180°–182° C. (decomposes). $^{13}$C NMR (CDCl$_3$): δ23.0, 61.2, 122.9, 123.1, 124.9, 125.0, 125.3, 125.7, 126.1, 126.4, 127.0, 128.9, 131.0, 134.5.

The alcohol functionality of 9-(β-hydroxyethyl)-10-bromoanthracene is protected in the form of a tetrahydropyran adduct. A 3-neck 250 mL flask fitted with a condenser, addition funnel, and Ar inlet is used to receive Mg shavings (2.1 g, 87 mmol) in dry THF (20 mL). A few drops of 1,2-dibromoethane is added to activate the Mg. A solution of 2-bromothiophene (87 mmol) in dry THF (20 mL) is added dropwise, and the reaction is allowed to stir overnight at reflux. After this time, the resulting slurry is added by cannula to a solution of tetrahydropyran-protected 9-(β-hydroxyethyl)-10-bromoanthracene (88 mmol) and NiCl$_2$ (dppe) (2.6 mmol) in dry THF (100 mL). The resulting solution is heated at reflux for 3 days. Solvent is removed under vacuum, and the residue is chromatographically separated on a silica gel column. Removal of solvent yields a crystalline solid in which the hydroxyl-protected anthracene moiety is coupled to the thiophene.

The substituted thiophene is converted to the corresponding 5-[9-(β-hydroxyethyl)-10-anthracene-2-thiophene carboxylic acid derivative. After removal of the tetrahydropyran protecting group, the lithium salt of the 5-[9-(β-hydroxyethyl)-10-anthracene-2-thiophenecarboxylic acid is prepared using the general procedure described in WO 98/30609.

The above compound is tethered through the β-hydroxyethyl group of the anthracene moiety to silica with its surface modified with PhSiH$_3$, as described in Example 1. The β-hydroxyethyl functionalized thiopheneacarboxylate ligand of above is tethered to PhSiH$_3$-modified silica using a procedure analogous to that described in WO 97/19959. The neutral Ni(II) chelate is prepared according to the procedure described in Example 1.

The support tethered neutral Ni(II) chelate of 5-[9-(α-hydroxyethyl)-10-anthracene-2-thiophenecarboxylic acid is useful as a heterogeneous catalyst for olefin polymerization, using the general procedures described below. The structure of the chelate is given by Formula (III) where R$^2$ groups at the 3- and 4-positions of the thiophene ring are H; R$^2$ at the 5-position is 9-(β-hydroxyethyl)-10-anthracene; M is Ni(II); Z is triphenylphosphine; and A is phenyl.

Example 7: Support Tethered Catalyst with Chelate of Formula IV

Preparation of silica-tethered catalyst of a substituted β-ketoamine of Formula (IV) is described. In the first synthetic step, 2,6-diisopropyl-4-hydroxyaniline is covalently bonded through the 4-hydroxy group to the surface of PhSiH$_3$-modified silica (with the silica surface treatment being carried out according to the procedure described in WO 97/19959). 10 g of Davison™ 952 silica pre-calcined at about 800° C. is placed in a 3-neck flask equipped with condenser, an addition funnel with equalizing side tube, and a magnetic stir bar. Under an Ar atmosphere, n-pentane (150 mL) is added, followed by syringe injection of PhSiH$_3$ (2.7 g, 25 mmol) and triethylamine (2.5 g, 25 mmol), respectively. Hydrogen gas evolves. The slurry is stirred magnetically for about 12 hours. The phenylsilane-modified silica is collected on a frit under Ar, washed with pentane (5×5 mL), and dried under vacuum. Yield is about 10.4 g. DRIFT IR: n(Si—H) 2178 cm$^{-1}$ (vs). Hydroxyl content of the silane-modified silica is undetectable (<0.01 mmol/g) spectroscopically.

Using a procedure adapted from J. E. Parks et al., *Inorg. Chem.*, 7, 1408–1416 (1968), acetylacetone is refluxed in dry THF with the aforementioned silane-modified silica to produce phenylsilane-modified silica with tethered β-ketoamine groups. The silica tethered product is collected as a yellow solid and dried under vacuum.

The support tethered β-ketoamine subsequently is deprotonated and converted to the corresponding neutral Ni(II) chelate by reaction in dry benzene with bis(triphenylphosphine)nickel(phenyl) chloride. Product is isolated, washed with benzene until the filtrate is colorless, and dried. The resultant silica-tethered neutral Ni(II) chelate is found to be useful as a heterogeneous catalyst for olefin polymerizations. The tethered chelate has the structure of Formula (IV) where the R$^3$ farthest from the K group is methyl while the R$^3$ closest to the K group is H; R$^5$ of the amine moiety is 2,6-diisopropyl-4-hydroxyphenyl; K is —C(CH$_3$); Z is triphenylphosphine; A is phenyl; and M is Ni(II).

Example 8: Support Tethered Catalyst of Formula IV

The general procedure for imine synthesis as described in WO 98/30609 is followed using 1-(4-ethenylbenzoyl) acetone (31.9 mmol) and 2,6-diisopropylaniline (1.3 equiv.) in methanol solution (100 mL). After 2 days, solvent is removed slowly and product crystallizes. The β-ketoamine of 1-(4-ethenylbenzoyl)-acetone is collected by filtration, washed with a small portion of methanol (5 mL), and dried. Yield of white solid is about 25%.

The above β-ketoamine is tethered to PhSiH$_3$-inodified silica through the p-ethenyl group by reaction of the functionalized chelate with PhSiH$_3$-modified silica using a catalytic amount of H$_2$PtCl$_6$. Preparation of PhSiH$_3$-modified silica is described above in Example 1.

The sodium salt of the above silica-tethered ligand compound is formed in the usual fashion according to the procedure of WO 98/30609. Reaction of the sodium salt of the tethered β-ketoamine with bis(triphenylphosphine) nickel(phenyl) chloride in benzene solution, analogous to the procedure described in Example 1, yields the silica-tethered neutral Ni(II) chelate of Formula (IV) where the R$^3$ farthest from the K group is 4-ethenylphenyl and the R$^3$ closest to the K group is H; K is —C(CH$_3$); R$^5$ is 2,6-diisopropylphenyl; M is Ni(II); Z is triphenylphosphine; and A is phenyl. The neutral Ni(II) chelate tethered through the ethenyl group on the phenyl ring to PhSiH$_3$-modified silica is useful as a heterogeneous catalyst for olefin polymerization using the descriptive procedures below.

Example 9: Support Tethered Catalyst with Ligand of Formula V

Preparation of a silica-tethered chelate of a pyrazolyl borate ligand of Formula (V) is described.

The boron-containing ligand is synthesized by known procedures as described in e.g., S. Trofimenko, *Chem. Rev.*, vol. 93, p. 943–980 (1993) and S. Trofimenko, *Prog. Inorg. Chem.*, vol. 34, p. 115–210 (1986). A hydroxy-functionalized borate ligand is prepared from 3-(9-anthryl) pyrazole and KB(4-hydroxyphenyl)H$_3$. The hydroxy-functionalized borate ligand is tethered through the hydroxyl moiety to the surface of PhSiH$_3$-modified silica using the procedure described in WO 97/19959.

The neutral Ni(II) chelate is prepared, according to the procedure of WO 98/30969. The resultant silica-tethered neutral Ni(II) chelate has the structure of Formula V where the two R¹ groups closest to the metal center are 9-anthracene; the remaining R¹ groups on the pyrazolyl rings are H; the R¹ groups on B are 4-hydroxyphenyl and H; Z is triphenylphosphine; and A is phenyl. The silica-tethered neutral Ni(II) chelate is useful as a heterogeneous catalyst for the polymerization of olefins using the procedures described below.

Example 10: Slurry Polymerization of Ethylene with Supported Tethered Catalyst In an Ar-filled dry box, support tethered neutral Ni(II) catalyst from Examples 1–9 are weighed into glass pressure bottles. For each, the bottle is fitted with a mechanical stirrer assembly, thermocouple, and addition ports. After removal of the bottle from the dry box, purified heptane (90 mL) is transferred by cannula under a positive pressure of ethylene. The glass bottle is partially immersed in a water bath to bring the internal temperature of solvent to 40° C. The slurry is stirred vigorously, 2 equivalents of a phosphine sponge (nickel bis-cyclooctadiene or tris-(pentafluorophenyl)boron) are added by syringe before the ethylene pressure is raised to and maintained at about 0.72 to 0.79 MPa (90–100 psig). Polyethylene particles are observed to form quickly and the slurry becomes completely opaque.

After completion of the polymerization reaction (usually 1–2 hours), ethylene flow is stopped and pressure is carefully vented from the glass reactor vessel. The contents of the glass bottle are poured into acidified methanol or acetone (1000 mL). Polyethylene product is collected by filtration using a Buchner funnel, washed with methanol (100 mL), and dried under vacuum.

Example 11: Slurry Polymerization of Ethylene at Elevated Pressure with Support Tethered Catalyst Compositions In an Ar-filled dry box, a 1.5 L stainless steel Parr reactor is charged with approximately 50 micromoles catalyst in the form of support-tethered neutral Ni(II) catalyst from Examples 1–9. The reactor is then removed from the dry box. The reactor is then charged with purified heptane (1 L) under an atmosphere of ethylene. The temperature of the reactor's contents is raised to 40° C. and 2 equivalents of phosphine sponge (nickel bis-cyclooctadiene or tris-(pentafluorophenyl)boron) agent are added. Ethylene pressure is raised to 3.48 to 3.55 MPa (490–500 psig), and the contents of the reactor are stirred vigorously. Ethylene is fed on demand as the polymerization commences and continues.

After approximately one hour the reactor is vented and disassembled, and the slurry of polymer product and solvent is poured into 1 L of acidified methanol or acetone. Pure white granular polymer product is collected by vacuum filtration, washed with methanol (250 mL), and dried under vacuum.

Example 12: Slurry Polymerization of Ethylene with Support Tethered Catalyst in the Presence of Added Lewis Base mIn an Ar-filled dry box, approximately 50 micromoles catalyst in the form of support-tethered neutral Ni(II) catalyst from Examples 1–9 is weighed into a glass pressure bottle. The bottle is fitted with a mechanical stirrer assembly, thermocouple, and addition ports. After removal of the bottle from the dry box, purified heptane (90 mL) and Lewis base additive (diethyl ether, 10 mL) are transferred by cannula under a positive pressure of ethylene. The glass bottle is partially immersed in a water bath to bring the internal temperature of the solvent to 40° C. The initially slightly opaque mixture is stirred vigorously, and ethylene pressure is raised to and maintained at about 0.72 to 0.79 MPa (90–100 psig). Polyethylene particles are observed to form quickly and the slurry becomes completely opaque.

After approximately one hour, ethylene flow is stopped and the pressure vented. The contents of the glass bottle are poured into acidified methanol or acetone (1000 mL). Polyethylene product is collected by filtration using a Buchner funnel, washed with methanol (100 mL), and dried under vacuum.

Example 13: Slurry Copolymerization of Ethylene and Functionalized Cyclic Olefins with Support Tethered Catalyst In an Ar-filled dry box, support-tethered neutral Ni(II) catalyst from Example 1–9 is weighed into a glass pressure bottle. A mechanical stirring assembly and thermocouple are attached, and the assembled apparatus is removed from the dry box. The pressure bottle is evacuated briefly, then back-filled with ethylene. Dry heptane (90 mL) is transferred by cannula into a $N_2$-flushed stainless steel container fitted with a two-way valve. The container is pressurized to about 0.45 MPa (50 psig) with ethylene.

Into another stainless steel container fitted with two-way valve, a solution of functionalized monomer (e.g., exo-functionalized norbornene) in THF (5 mL) is transferred by cannula, and the container is pressurized to about 0.45 MPa (50 psig), with ethylene. In rapid sequence, the mixed heptane and ether solution of functionalized monomer, each under a positive pressure, are transferred into the glass pressure bottle. A water bath is used to warm the contents of the bottle to about 40° C. before the bottle is pressurized with ethylene and maintained at about 0.72 to 0.79 MPa (90–100 psig).

The slurry gradually becomes more opaque and an increasing amount of polymer particles are observed. After approximately one hour, the pressure is released and the contents of the bottle are poured into acidified acetone (1 L). White polymer powder is collected by vacuum filtration, re-suspended in acetone (500 mL), filtered again, and washed with methanol (100 mL). The polymer is dried under vacuum before composition is determined by $^{13}C$ NMR.

Various modifications and alterations that do not depart from the scope and spirit of this invention will become apparent to those skilled in the art. This invention is not to be unduly limited to the illustrative embodiments set forth herein.

We claim:

1. A catalyst for olefin polymerization represented by the formula STCat where Cat is one of the following:

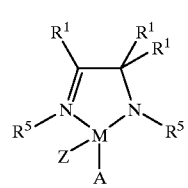

(II)

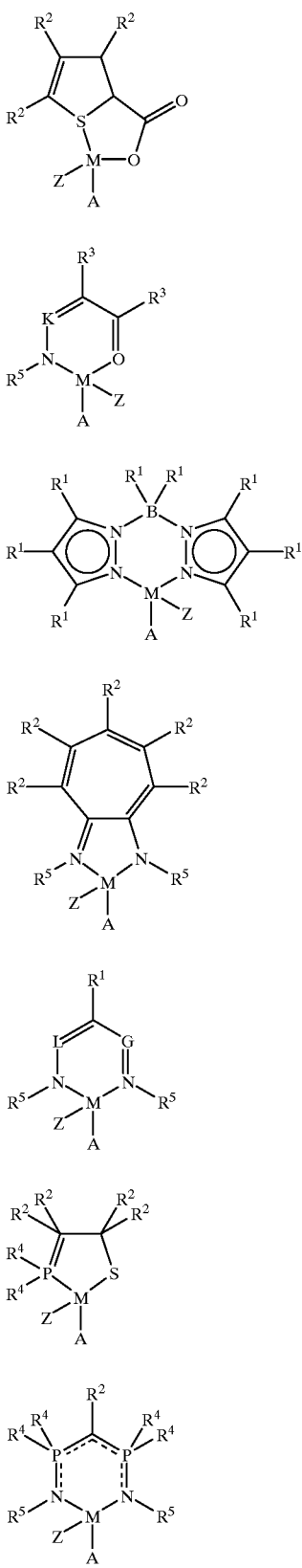

wherein each R[1] independently is H, hydrocarbly, substituted hydrocarbly, or any two R[1] groups on vicinal carbons together form a hydrocarbylene ring;

each R[2] independently is H, hydrocarbyl, substituted hydrocarbyl, an inert functional group, or any two R[2] groups on vicinal carbon atoms together form a hydrocarbylene ring;

each R[3] independently is hydrocarbyl, substituted hydrocarbyl, an inert functional group, or the two R[3] groups on vicinal carbon atoms together form a hydrocarbylene ring;

each R[4] independently is hydrocarbyl or substituted hydrocarbyl;

each R[5] independently is a sterically bulky hydrocarbyl;

M is a transition metal selected from the group consisting of Ti, Zr, Hf, Fe, Co, Ni, Ru, Rh, Pd, Os, Ir, and Pt;

K is N or C—R[4];

Z is a coordination ligand;

G and L independently each in N or C—R[3]; and

A is a $C_1$–$C_{11}$ alkyl, an aryl, substituted aryl or H; with the proviso that at least one of R[1], R[2], R[3], R[4], and R[5] is a covalently bonded tethered support group ST where S is a substantially inert organic or inorganic macromolecule, and T is a $C_2$–$C_{40}$ hydrocarbylene, a $C_2$–$C_{40}$ hydrocarbyloxyene, a $C_2$–$C_{40}$ fluorinated hydrocarbylene, or a $C_2$–$C_{40}$ fluorinated hydrocarbyloxyene group.

2. The catalyst of claim 1 wherein said support is an inorganic oxide comprising silica, alumina, aluminasilicates, alumina phosphate, titania, or clay.

3. The catalyst of claim 1 wherein said support comprises silica.

4. The catalyst of claim 1 wherein ST— is R[5] and T comprises a sterically bulky group directly pendent from said Cat group.

5. The catalyst of claim 3 wherein ST— is R[5] and T comprises a sterically bulky group directly pendent from said Cat group.

6. The catalyst of claim 5 wherein said sterically bulky group is a substituted or unsubstituted arylene group or an alkarylene group.

7. The catalyst of claim 6 wherein said sterically bulky group is substituted with and covalently bonded to the support by a $C_2$–$C_{12}$ alkylene, $C_2$–$C_{12}$ oxyalkylene, $C_2$–$C_{12}$ fluorinated alkylene, or $C_2$–$C_{12}$ fluorinated oxyalkylene group.

8. The catalyst of claim 1 wherein the support group S is covalently bonded to the tether group T through a silane group.

9. The catalyst of claim 3 wherein the support group S is covalently bonded to the tether group T through a silane group.

10. The catalyst of claim 4 wherein the support group S is covalently bonded to the tether group T through a silane group.

11. The catalyst of claim 1 wherein M is Ni or Pd.

12. A process for forming a polyolefin comprising contacting at least one olefinic compound with a catalyst composition comprising a compound represented by the general formula:

(II)
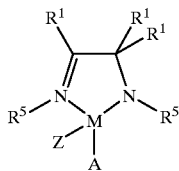

(III)
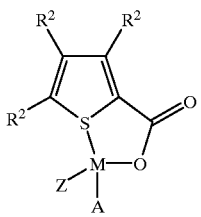

(IV)
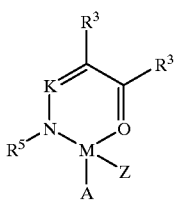

(V)
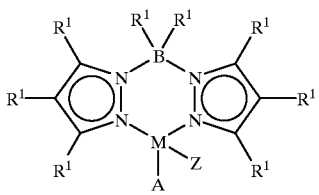

(VI)
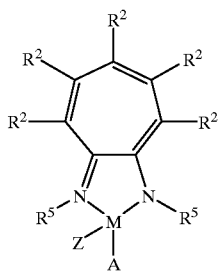

(VII)
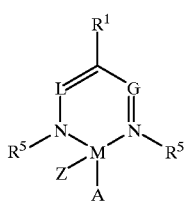

(VIII)
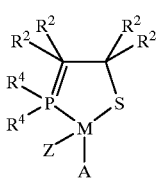

(IX)
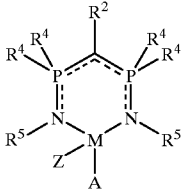

wherein
each $R^1$ independently is H, hydrocarbyl, substituted hydrocarbyl, or any two $R^1$ groups on vicinal carbons together form a hydrocarbylene ring;
each $R^2$ independently is H, hydrocarbyl, substituted hydrocarbyl, an inert functional group, or any two $R^2$ groups on vicinal carbon atoms together form a hydrocarbylene ring;
each $R^3$ independently is hydrocarbyl, substituted hydrocarbyl, an inert functional group, or the two $R^3$ groups on vicinal carbon atoms together can form a hydrocarbylene ring;
each $R^4$ independently is hydrocarbyl or substituted hydrocarbyl;
each $R^5$ independently is a sterically bulky hydrocarbyl;
M is a transition metal selected from the group consisting of Ti, Zr, Hf, Fe, Co, Ni, Ru, Rh, Pd, Os, Ir, and Pt;
K is N or C—$R^4$;
Z is a coordination ligand;
G and L independently each is selected from N or C—$R^3$; and
A is a $C_1$–$C_{11}$ alkyl, aryl, substituted aryl or H; with the proviso that at least one of $R^1$, $R^2$, $R^3$, $R^4$, and $R^5$ is a covalently bonded tethered support group ST where S is a substantially inert organic or inorganic macromolecule, and T is a $C_2$–$C_{40}$ hydrocarbylene, a $C_2$–$C_{40}$ hydrocarbyloxyene, a $C_2$–$C_{40}$ fluorinated hydrocarbylene, or a $C_2$–$C_{40}$ fluorinated hydrocarbyloxyene group.

13. The process of claim 12 wherein said support is an inorganic oxide comprising silica, alumina, aluminasilicates, alumina phosphate, titania, or clay.

14. The process of claim 12 wherein said support comprises silica.

15. The process of claim 12 wherein ST— is $R^5$ and T comprises a sterically bulky group directly pendent from said Cat group.

16. The process of claim 13 wherein the support group S is covalently bonded to the tether group T through a silane group.

17. The process of claim 12 wherein the catalyst composition further comprises at least one of a phosphine sponge and a Lewis base.

18. The process of claim 12 wherein the olefinic compound comprises a $C_2$–$C_3$ olefin.

19. The process of claim 18 wherein the olefinic compound further comprises at least one functionalized 1-olefin.

20. The process of claim 17 wherein the catalyst comprises a Lewis base selected from ethers, esters, aldehydes, ketones, alcohols, amides, organocarbonates, organonitro compounds, and mixtures thereof.

* * * * *